(12) United States Patent
Sakurai

(10) Patent No.: US 12,479,132 B2
(45) Date of Patent: Nov. 25, 2025

(54) RESIN SHAPING MOLD AND RESIN SHAPING METHOD

(71) Applicant: TOYOTA JIDOSHA KABUSHIKI KAISHA, Toyota (JP)

(72) Inventor: Kosuke Sakurai, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 18/259,610

(22) PCT Filed: Jan. 8, 2021

(86) PCT No.: PCT/JP2021/000493
§ 371 (c)(1),
(2) Date: Jun. 28, 2023

(87) PCT Pub. No.: WO2022/149263
PCT Pub. Date: Jul. 14, 2022

(65) Prior Publication Data
US 2024/0051189 A1 Feb. 15, 2024

(51) Int. Cl.
*B29C 33/22* (2006.01)
*B29C 33/40* (2006.01)
*B29C 43/36* (2006.01)

(52) U.S. Cl.
CPC ............ *B29C 33/22* (2013.01); *B29C 33/405* (2013.01); *B29C 43/36* (2013.01); *B29C 2043/366* (2013.01)

(58) Field of Classification Search
CPC ... B29C 33/22; B29C 33/68; B29C 2043/366; B29C 33/405; B29C 45/14065;
(Continued)

(56) References Cited

U.S. PATENT DOCUMENTS 11,472,077 B2 * 10/2022 Hirasawa .......... B29C 45/14065
2014/0106022 A1 * 4/2014 Navarra Pruna ....... B29C 45/66
425/589

(Continued)

FOREIGN PATENT DOCUMENTS

CN 104690869 A 6/2015
JP 64-47516 A 2/1989
(Continued)

OTHER PUBLICATIONS

Kamiya (Machine Translation of JP2015009539) (Year: 2015).*
(Continued)

*Primary Examiner* — Michael A Tolin
*Assistant Examiner* — Hana C Page
(74) *Attorney, Agent, or Firm* — Oblon, McClelland, Maier & Neustadt, L.L.P.

(57) ABSTRACT

A resin shaping mold includes an upper mold, a lower mold arranged to be opposed to the upper mold, a sliding mechanism configured to be slidable on a surface of the lower mold and having a pressing surface including a surface directed in a different direction from a direction of pressing on a resin by the upper mold and the lower mold, and a rubber member formed to cover at least the pressing surface of the sliding mechanism and a gap between the pressing surface and the lower mold.

11 Claims, 5 Drawing Sheets

(58) Field of Classification Search
CPC .... B29C 2045/338; B29C 2045/14663; B29C 45/66; B29C 2045/14163
See application file for complete search history.

(56) References Cited

U.S. PATENT DOCUMENTS

2019/0070772 A1* 3/2019 Stone ............... B29D 99/0003
2020/0406512 A1* 12/2020 Kuo ................. B29C 43/3642

FOREIGN PATENT DOCUMENTS

| JP | 2-127017 A | 5/1990 |
| JP | 2016-83781 A | 5/2016 |
| JP | 2019-151030 A | 9/2019 |

OTHER PUBLICATIONS

Takahashi (Machine Translation of JP6404734B2) (Year: 2016).*
Kobayashi (Machine Translation of JP2005125621) (Year: 2005).*
Otsuki (Machine Translation of JP2019059159) (Year: 2019).*
International Search Report Issued Feb. 22, 2021, in PCT/JP2021/000493, filed on Jan. 8, 2021, 2 pages.

* cited by examiner

RESIN SHAPING MOLD AND RESIN SHAPING METHOD

TECHNICAL FIELD

The present invention relates to a resin shaping mold and a resin shaping method.

BACKGROUND ART

In fast cycle shaping of a CFRP (carbon fiber reinforced plastics) material such as a prepreg, for example, a press shaping technique such as PCM (prepreg compression molding) has been used. In press shaping, a material (resin) is compressed by a load in a mold movable direction, but because a pressure from a mold is not sufficiently transmitted to a vertical wall portion of a material (a side surface portion of a material) in a direction vertical to the mold movable direction, for example, in a case where the mold movable direction is a perpendicular direction, there is a possibility that depletion of resin, a void, and so forth occurs.

A solution to such a problem is disclosed in Patent Literature 1 and Patent Literature 2, for example.

Patent Literature 1 discloses a technique in which a pressure is applied to a vertical wall portion of a resin by using a silicone for a lower mold. Further, Patent Literature 2 discloses a technique in which a pressure is applied to a vertical wall portion of a resin by using a slide core.

CITATION LIST

Patent Literature

Patent Literature 1: Japanese Unexamined Patent Application Publication No. 2019-151030
Patent Literature 2: Japanese Unexamined Patent Application Publication No. 2016-83781

SUMMARY OF INVENTION

Technical Problem

However, because even in a case where a silicone is used for a lower mold as in Patent Literature 1, a pressure applied to a vertical wall portion of a resin becomes lower than a pressure applied to a bottom surface portion of the resin, there still is a possibility that depletion of resin, a void, and so forth occurs. Further, in a case where a slide core is used as in Patent Literature 2, there is a possibility that resin leaks to a gap portion between the slide core and a lower mold and a burr or the like occurs. That is, there has been a problem that high-quality resin shaping may not be performed in related art.

The present disclosure has been made in consideration of the above background, and an object thereof is to provide a resin shaping mold and a resin shaping method which are capable of performing high-quality resin shaping by using a rubber member and a sliding mechanism.

Solution to Problem

A resin shaping mold according to the present disclosure includes: a first mold; a second mold arranged to be opposed to the first mold; a sliding mechanism configured to be slidable on a surface of the second mold and having a pressing surface including a surface directed in a different direction from a direction of pressing on a resin by the first mold and the second mold; and a first rubber member formed to cover at least the pressing surface of the sliding mechanism and a gap between the pressing surface and the second mold. Because the resin shaping mold uses the rubber member and the sliding mechanism and can thereby press a vertical wall portion of the resin by a sufficiently large force, depletion of resin, a void, and so forth can be prevented from occurring, and a burr or the like can be prevented from occurring by covering a gap between the pressing surface of the sliding mechanism and a lower mold by the rubber member. In other words, the resin shaping mold can perform high-quality resin shaping.

A cavity space which defines a shape of the resin may be surrounded by the first mold and the first rubber member.

A cavity space which defines a shape of the resin may be surrounded by the first mold, the second mold, and the first rubber member.

The first rubber member may be formed to further cover a part of the surface of the second mold, and a cavity space which defines a shape of the resin may be surrounded by the first mold and the first rubber member.

The resin shaping mold may further include a second rubber member formed to cover a surface of the first mold, and a cavity space which defines a shape of the resin may be surrounded by the first rubber member and the second rubber member.

It is preferable that the sliding mechanism and the first rubber member have fitting shapes which are fitted to each other.

It is preferable that the first mold and the sliding mechanism respectively have inclined surfaces which have predetermined angles relative to the direction of pressing on the resin by the first mold and the second mold and are formed to slide on each other during a press of the resin.

The resin shaping mold may further include a motive power unit configured to slide the sliding mechanism.

It is preferable that the resin shaping mold include a return mechanism configured to return the sliding mechanism to a position, at a time before a press, in removal of molds.

It is preferable that the second mold and the sliding mechanism have guide structures which define a sliding direction of the sliding mechanism.

A resin shaping method according to the present disclosure is a resin shaping method using a resin shaping mold which includes a first mold, a second mold arranged to be opposed to the first mold, a sliding mechanism configured to be slidable on a surface of the second mold and having a pressing surface including a surface directed in a different direction from a direction of pressing on a resin by the first mold and the second mold, and a first rubber member formed to cover at least the pressing surface of the sliding mechanism and a gap between the pressing surface and the second mold, the resin shaping method including: charging a resin in a state where the first mold and the second mold are open; pressing the first mold toward the second mold; retaining a pressure on the resin by a surface of the first mold and a surface of the first rubber member; curing the resin by cooling; and removing molds. Because the resin shaping method uses the rubber member and the sliding mechanism and can thereby press a vertical wall portion of the resin by a sufficiently large force, depletion of resin, a void, and so forth can be prevented from occurring, and a burr or the like can be prevented from occurring by covering a gap between the pressing surface of the sliding mechanism and a lower mold by the rubber member. In other words, the resin shaping method can perform high-quality resin shaping.

Advantageous Effects of Invention

The present disclosure can provide a resin shaping mold and a resin shaping method which are capable of performing high-quality resin shaping by using a rubber member and a sliding mechanism.

DESCRIPTION OF EMBODIMENTS

Figure 1:
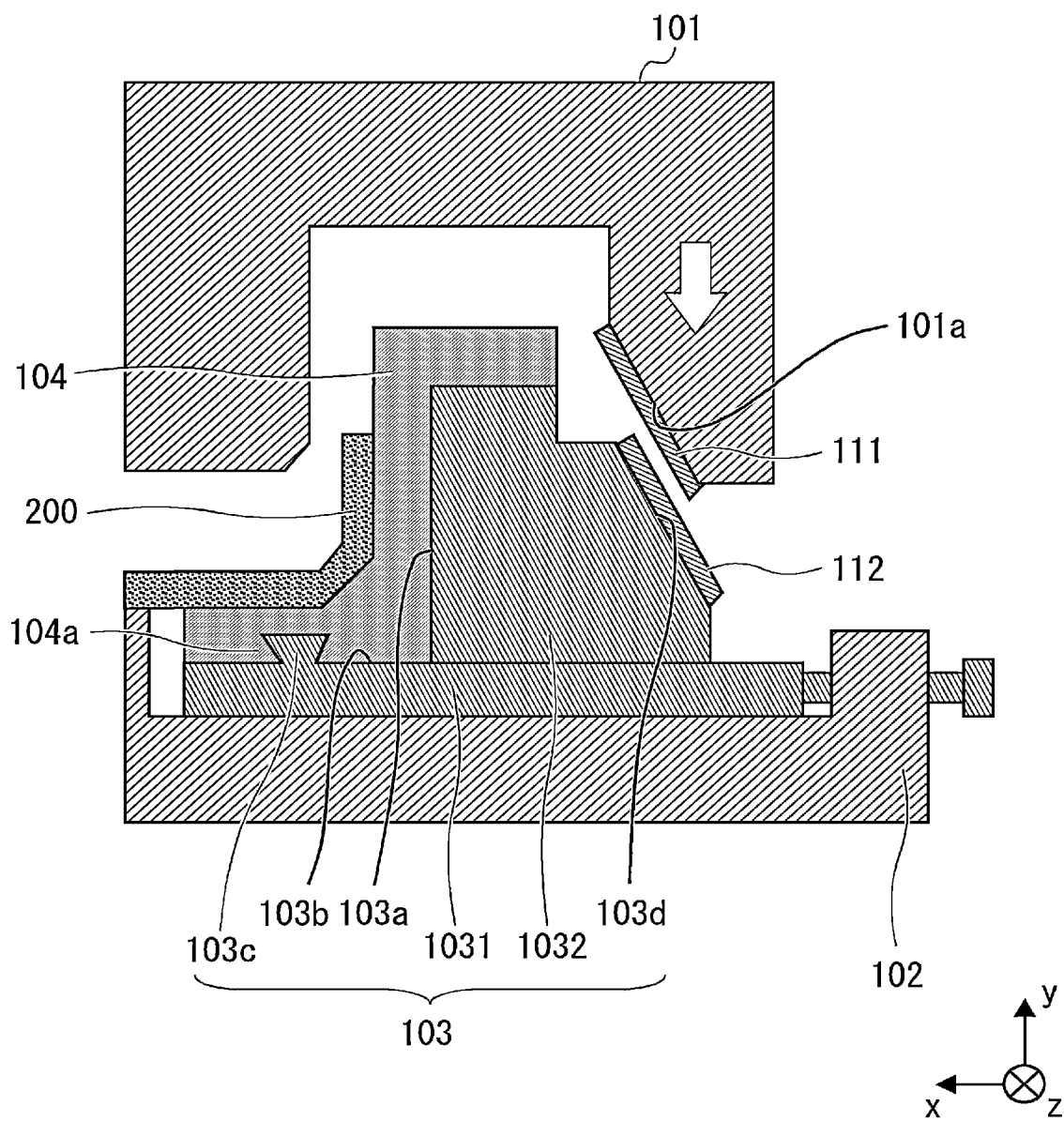
FIG. 1 is an outline cross-sectional view illustrating one example of a resin shaping mold, at a time before a press, according to a first embodiment.

In the following, the present invention will be described through an embodiment of the invention; however, the invention according to Claims is not limited to the following embodiment. Further, not all configurations described in the embodiment are necessarily required as means for solving problems. For clarification of descriptions, omission and simplification are appropriately made in the following descriptions and drawings. In each of the drawings, the same reference characters are given to the same elements, and repetitions of descriptions will be skipped as needed.

First Embodiment

Figure 2:
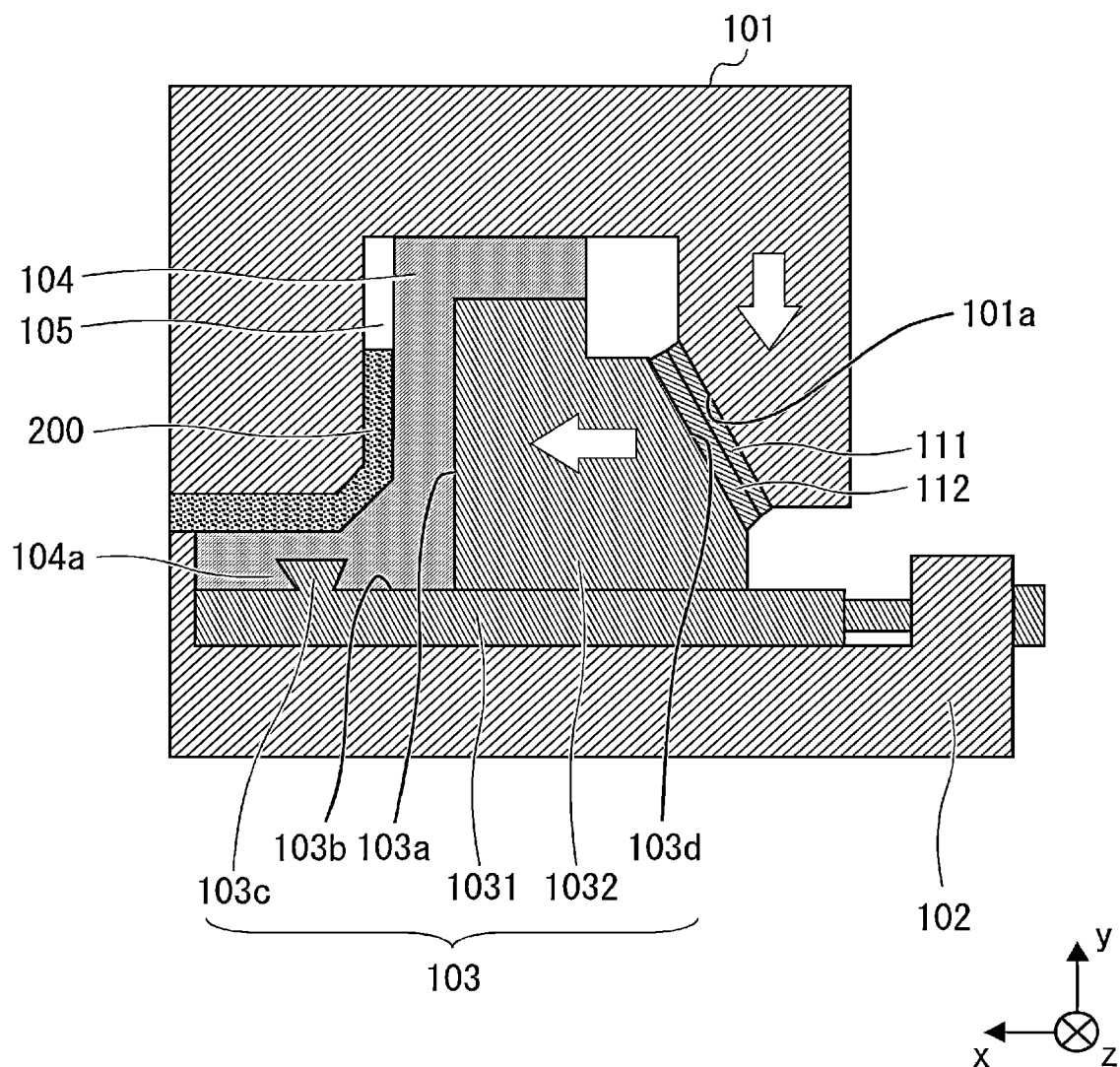
FIG. 2 is an outline cross-sectional view illustrating one example of the resin shaping mold, during a press, according to the first embodiment.

FIG. 1 and FIG. 2 are outline cross-sectional views illustrating one example of a resin shaping mold according to a first embodiment. Note that FIG. 1 illustrates a state of the resin shaping mold at a time before a press, and FIG. 2 illustrates a state of the resin shaping mold during a press.

As illustrated in FIG. 1 and FIG. 2, a resin shaping mold 100 includes an upper mold (first mold) 101, a lower mold (second mold) 102, a sliding mechanism 103, and a rubber member 104. The resin shaping mold 100 is used for shaping a CFRP material such as a prepreg (hereinafter, simply referred to as resin).

The upper mold 101 and the lower mold 102 are casting molds which correspond to a shape of a resin 200 to be shaped. By opening and closing the upper mold 101 and the lower mold 102, shaping of the resin 200 and extraction of the cured resin 200 are performed. The lower mold 102 is positioned on a lower side (y-axis negative direction side) relative to the upper mold 101 in a perpendicular direction (y-axis direction) and receives the resin 200 to be shaped. The upper mold 101 moves downward (y-axis negative direction) in the perpendicular direction and thereby presses the resin 200 which is charged between the upper mold 101 and the lower mold 102.

The sliding mechanism 103 is configured to be slidable along a surface of the lower mold 102. In the present embodiment, the sliding mechanism 103 is configured to be slidable in a direction at a right angle to a direction of pressing on the resin 200 by the upper mold 101 and the lower mold 102, that is, in a horizontal direction (x-axis direction).

Further, the sliding mechanism 103 is configured to slide along the surface of the lower mold 102 and to be capable of pressing the resin 200 in a direction different from the direction of pressing on the resin 200 by the upper mold 101 and the lower mold 102. In the present embodiment, the sliding mechanism 103 is configured to slide along the surface of the lower mold 102 and to be capable of pressing the resin 200 in a direction at a right angle to the direction of pressing on the resin 200 by the upper mold 101 and the lower mold 102, that is, in the horizontal direction. Accordingly, the sliding mechanism 103 can press a vertical wall portion of the resin 200 (a side surface portion of the resin 200) by a sufficient pressure.

More specifically, the sliding mechanism 103 includes a pedestal 1031 and a pressing portion 1032. The pedestal 1031 is a plate-shaped metal member which is installed to be slidable along the surface of the lower mold 102. The pressing portion 1032 is a metal member which has a surface 103a directed in a sliding direction (x-axis positive direction) of the sliding mechanism 103 and is fixed onto the pedestal 1031. Note that the pedestal 1031 and the pressing portion 1032 may integrally be formed. The sliding mechanism 103 slides along the surface of the lower mold 102 and thereby presses the vertical wall portion of the resin 200 by using a pressing surface which includes the surface 103a.

Note that in the present embodiment, a description is made by raising, as an example, a case where the surface 103a is directed in the sliding direction (x-axis positive direction) of the sliding mechanism 103, but this is not restrictive. As long as the surface 103a is capable of pressing the vertical wall portion of the resin 200, the surface 103a may be directed in an arbitrary direction in accordance with a shape of a shaped mold. However, as a direction of the surface 103a becomes closer to the sliding direction of the sliding mechanism 103, a pressure can more efficiently be applied to the vertical wall portion of the resin 200.

Further, in the present embodiment, not only the surface 103a of the pressing portion 1032 but also a part 103b of a surface of the pedestal 1031 is used as a pressing surface which presses the resin 200. However, the surface of the pedestal 1031 does not have to be exposed to a side of a cavity space 105 which will be described later. In such a case, in the sliding mechanism 103, only the surface 103a of the pressing portion 1032 is used as the pressing surface which presses the resin 200.

The rubber member 104 is also referred to as elastomer and is configured with a silicone material, for example. However, a configuration of the rubber member 104 is not limited to a case where a silicone member is used, but it is sufficient that a polymer material which has an elastic force is used. In the present embodiment, a description will be made by raising, as an example, a case where the rubber member 104 is configured with a silicone material. Note that a silicone material has thermal resistance of 200 degrees or higher and has flexibility of Shore A hardness of 30 to 90.

Here, the rubber member 104 is formed to cover at least the pressing surfaces (surfaces 103a and 103b) of the sliding mechanism 103 and a gap between the pressing surfaces of the sliding mechanism 103 and the lower mold 102.

Consequently, in the present embodiment, the cavity space 105 which defines a shape of the resin 200 is surrounded by a surface (tool surface) of the upper mold 101 and the rubber member 104 which covers the pressing surfaces (surfaces 103a and 103b) and so forth of the sliding mechanism 103. The resin 200 is charged into the cavity space 105, is subjected to a retained pressure, and is thereby shaped into a predetermined shape.

The sliding mechanism 103 slides along the surface of the lower mold 102 and can thereby press the vertical wall portion of the resin 200 by a sufficient pressure via the rubber member 104. Accordingly, depletion of resin, a void, and so forth can be prevented from occurring to the vertical wall portion of the resin 200. Further, the gap between the pressing surfaces of the sliding mechanism 103 and the lower mold 102 is covered by the rubber member 104, and leakage of resin to the gap can thereby be prevented. Accordingly, a burr or the like can be prevented from occurring to a shaped mold.

Note that it is preferable that the sliding mechanism 103 and the rubber member 104 have fitting shapes which are fitted to each other. In the present embodiment, a fitting portion 103c in a protruding shape is provided to the surface of the pedestal 1031 of the sliding mechanism 103, and a fitting portion 104a in a recessed shape is provided to the rubber member 104 so as to be opposed to the fitting portion 103c in the protruding shape. The fitting portion 103c and the fitting portion 104a are fitted together, the rubber member 104 can thereby be fixed to the sliding mechanism 103, and the rubber member 104 can easily be detached from the sliding mechanism 103 as needed.

Further, it is preferable that each of the upper mold 101 and the sliding mechanism 103 have an inclined surface at a predetermined angle relative to the direction of pressing on the resin 200 by the upper mold 101 and the lower mold 102. In the present embodiment, an inclined surface 101a is provided to the upper mold 101, and an inclined surface 103d is provided to the pressing portion 1032 of the sliding mechanism 103. The inclined surface 101a and the inclined surface 103d contact with each other and slide on each other by movement of the upper mold 101 in the direction of pressing (y-axis negative direction). Accordingly, a perpendicularly downward force of the upper mold 101 is converted to a force in a horizontal direction (z-axis positive direction) by which the pressing surface 103a of the sliding mechanism 103 presses the vertical wall portion of the resin 200 (the side surface portion of the resin 200). Accordingly, because a motive power source such as a hydraulic pressure for sliding the sliding mechanism 103 becomes unnecessary, costs can be reduced.

Note that in order to realize a sliding motion with a low resistance, as illustrated in FIG. 1 and FIG. 2, plates 111 and 112 with low friction coefficients of surfaces may respectively be mounted on the inclined surface 101a and the inclined surface 103d, or those may be coated with lubricating oil or the like.

Further, instead of or in addition to respectively providing the inclined surfaces 101a and 103d to the upper mold 101 and the sliding mechanism 103, a motive power unit which slides the sliding mechanism 103 may be provided. Any motive power unit such as a servomotor or an actuator can be employed as long as that can slide the sliding mechanism 103 by motive power.

Further, it is preferable that the resin shaping mold 100 include a return mechanism which returns the sliding mechanism 103 at a time after sliding to a position of the sliding mechanism 103 at a time before sliding (that is, before a press). The return mechanism may be a spring or the like or may be the above-described motive power unit, for example. The resin shaping mold 100 includes the return mechanism, and extraction thereby becomes easy in removal of the molds.

In addition, it is preferable that the lower mold 102 and the sliding mechanism 103 have guide structures which define the sliding direction of the sliding mechanism 103. For example, a groove is formed along the x-axis direction in the surface of the lower mold 102, and a groove to be fitted in the groove formed in the surface of the lower mold 102 is formed along the x-axis direction in a bottom surface of the pedestal 1031 of the sliding mechanism 103. Accordingly, carrying in sliding can be prevented.

(Resin Shaping Method Using Resin Shaping Mold 100)

Figure 3:
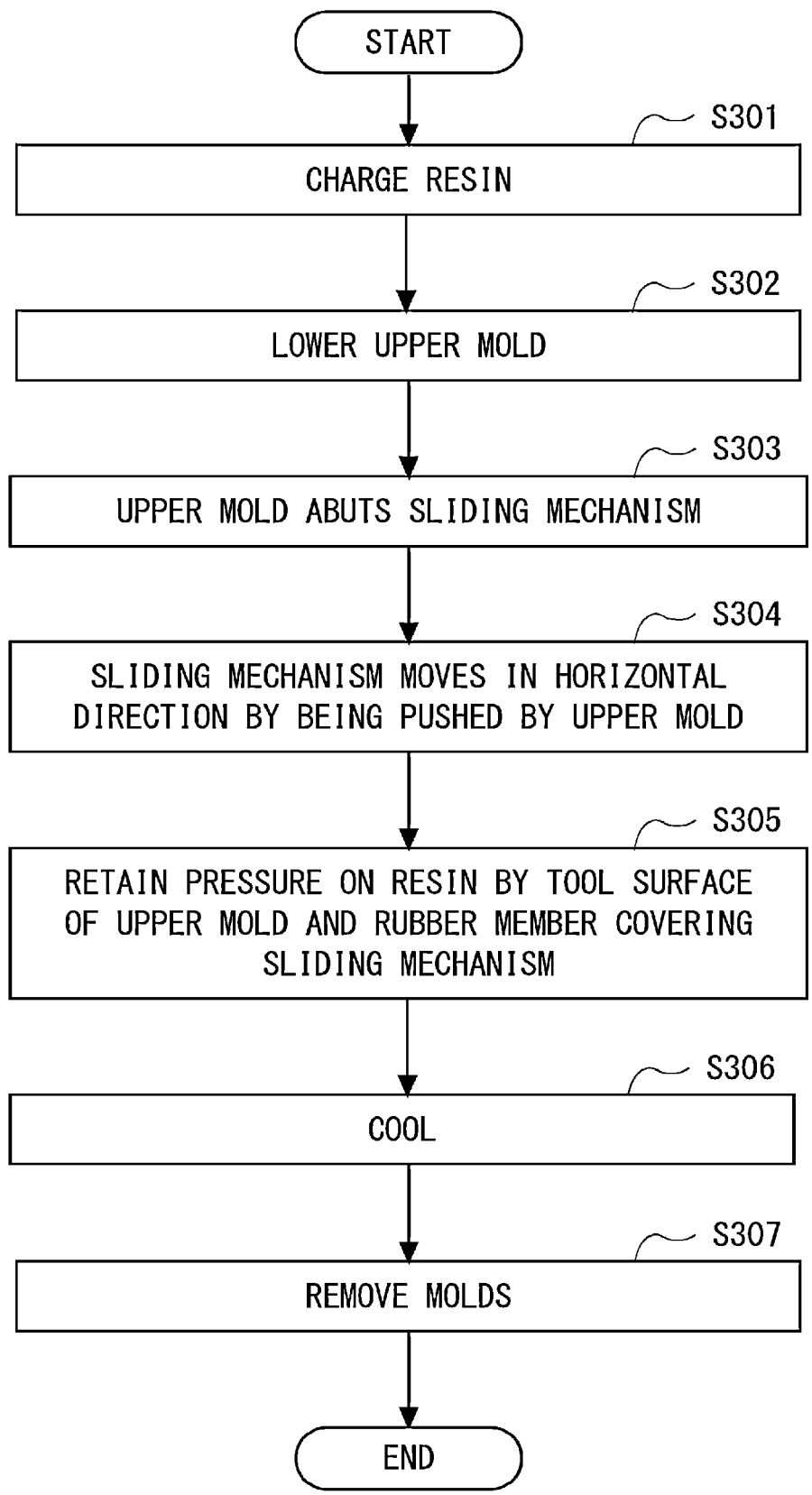
FIG. 3 is a flowchart illustrating one example of a resin shaping method according to the first embodiment.

Next, by using FIG. 3 in addition to FIG. 1 and FIG. 2, a description will be made about a resin shaping method using the resin shaping mold 100. FIG. 3 is a flowchart illustrating one example of the resin shaping method using the resin shaping mold 100.

First, the resin 200 is changed into the resin shaping mold 100 in a state where the upper mold 101, the lower mold 102, and the sliding mechanism 103 are open (step S301).

Subsequently, the upper mold 101 is lowered (step S302).

While the upper mold 101 is being lowered, the inclined surface 101a (more specifically, the plate 111) of the upper mold 101 abuts the inclined surface 103d (more specifically, the plate 112) of the sliding mechanism 103 (step S303).

Subsequently, the upper mold 101 is further lowered, the inclined surface 101a of the upper mold 101 slides on the inclined surface 103d of the sliding mechanism 103. Accordingly, the sliding mechanism 103 slides in the horizontal direction (step S304). In other words, the perpendicularly downward force of the upper mold 101 is converted to the force in the horizontal direction by which the pressing surface 103a of the sliding mechanism 103 presses the vertical wall portion of the resin 200.

Subsequently, a pressure on the resin 200 is retained by the surface (tool surface) of the upper mold 101 and the rubber member 104 which covers the pressing surfaces and so forth of the sliding mechanism 103 (step S305). Accordingly, the resin 200 is shaped into a predetermined shape that is defined by the cavity space 105 which is formed with the upper mold 101 and the rubber member 104.

Subsequently, the resin 200 which is shaped into the predetermined shape is cooled (step S306). Accordingly, the resin 200 which is shaped into the predetermined shape is cured in a state where the shape defined by the cavity space 105 is maintained.

Subsequently, the upper mold 101 is lifted, and the molds are thereby opened. The molds are removed from the shaped resin 200, and the shaped resin 200 becomes a shaped mold (step S307).

As described above, the resin shaping mold 100 according to the present embodiment uses the rubber member and the sliding mechanism, can thereby press the vertical wall portion of the resin by a sufficiently large force, and can thus prevent depletion of resin, a void, and so forth from occurring. Further, in the resin shaping mold 100 according to the present embodiment, the gap between the pressing surfaces of the sliding mechanism and the lower mold is covered by the rubber member, and a burr or the like can thereby be prevented from occurring. In other words, the resin shaping mold 100 according to the present embodiment can perform high-quality resin shaping.

Figure 4:
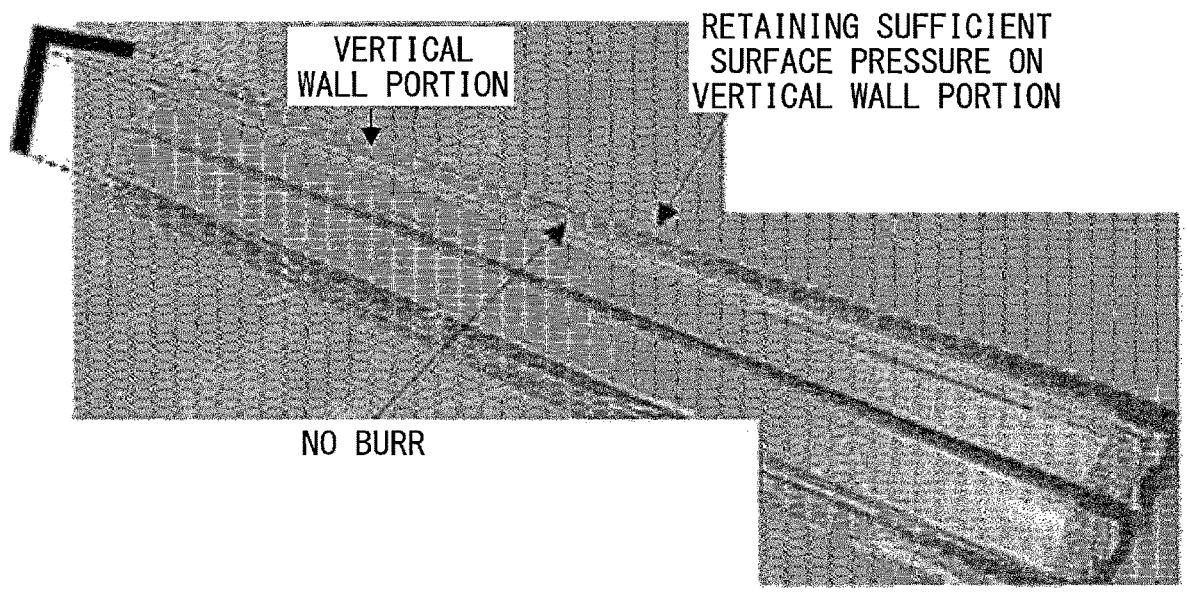
FIG. 4 is a diagram illustrating an example of a shaped article of resin which is shaped by the resin shaping mold according to the first embodiment.
Figure 5:
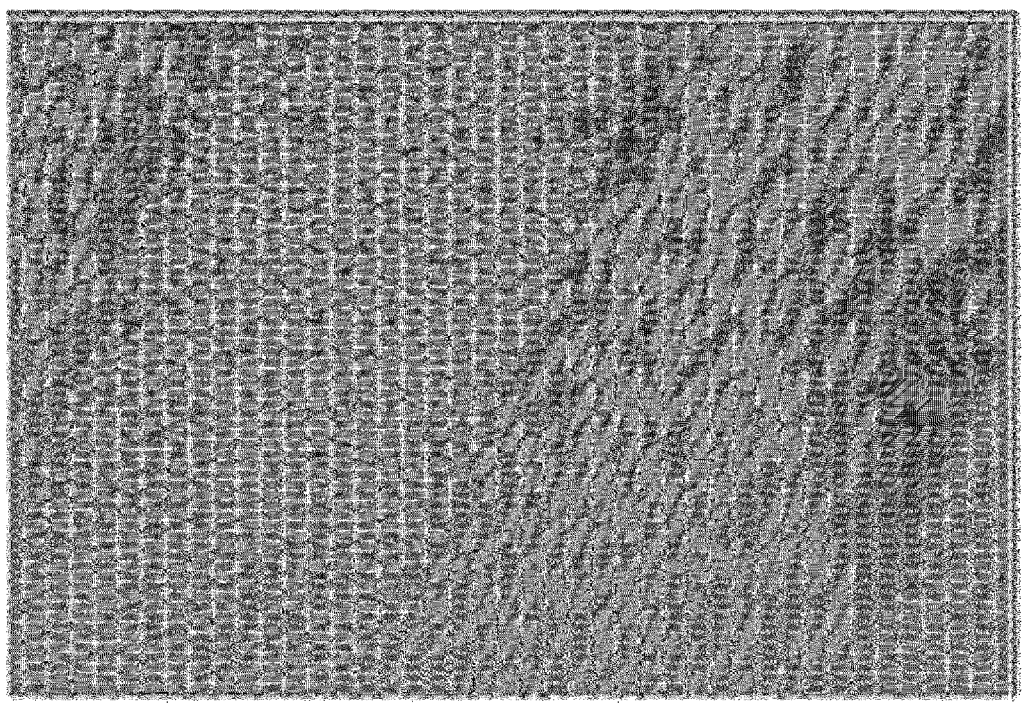
FIG. 5 is a diagram illustrating a cross section of the shaped mold of resin which is shaped by the resin shaping mold according to the first embodiment.

FIG. 4 is a diagram illustrating an example of a shaped mold of the resin 200 which was actually shaped by the resin shaping mold 100. Further, FIG. 5 is a diagram illustrating a cross section of the shaped mold of the resin 200 which was actually shaped by the resin shaping mold 100.

As illustrated in FIG. 4, in the shaped mold which was shaped by the resin shaping mold 100, such a large burr that it was unignorable did not occur in a portion corresponding to a gap portion between the lower mold 102 and the sliding mechanism 103. Further, as illustrated in FIG. 5, in the shaped mold which was shaped by the resin shaping mold 100, because a sufficient pressure was applied to the vertical wall portion, such a large void that it was unignorable did not occur.

In the present embodiment, a description is made by raising, as an example, a case where the sliding mechanism 103 is configured to be slidable along the surface of the lower mold 102, but this is not restrictive. For example, the sliding mechanism 103 may be configured to be slidable on a surface of a member which is fixed to the surface of the lower mold 102. Here, it can be considered that the surface of the member which is fixed to the surface of the lower mold 102 is a part of the surface of the lower mold 102.

Further, in the present embodiment, a description is made by raising, as an example, a case where the sliding mechanism 103 is configured to be slidable along the surface of the lower mold 102, but this is not restrictive. For example, the sliding mechanism 103 may be configured to be slidable on the surface of the upper mold 101 or a surface of a member which is fixed to the surface of the upper mold 101. Here, it can be considered that the surface of the member which is fixed to the surface of the upper mold 101 is a part of the surface of the upper mold 101.

Further, in the present embodiment, a description is made by raising, as an example, a case where the lower mold 102 is a mold which is fixed (fixed mold) and the upper mold 101 is a mold which is configured to be movable (moving mold), but this is not restrictive. The upper mold 101 may be the fixed mold, and the lower mold 102 may be the moving mold.

Further, in the present embodiment, a description is made by raising, as an example, a case where the cavity space 105 is surrounded by the surface of the upper mold 101 and the rubber member 104 which covers the pressing surfaces (surfaces 103a and 103b) and so forth of the sliding mechanism 103, but this is not restrictive. The cavity space 105 may be formed with a part of the surface of the lower mold 102 in addition to the surface of the upper mold 101 and the rubber member 104 which covers the pressing surfaces of the sliding mechanism 103.

In addition, a second rubber member may further be provided to the surface of the upper mold 101 so as to be continuous with the rubber member 104 as a first rubber member or separately from the rubber member 104. That is, a whole surface of the cavity space 105 may be covered by the rubber members. However, by using the rubber members not for the whole surface of the cavity space 105 but only for a part (for example, the pressing surfaces of the sliding mechanism 103 and the gap between the pressing surfaces and the lower mold 102), costs can be reduced.

Note that the present invention is not limited to the above embodiment but can appropriately be modified without departing from the scope of the gist thereof. For example, in the above embodiment, a description is made about a case where only the upper mold and the lower mold are provided, but further split molds may be provided. For example, a mold may be provided which is split for a side surface. Further, the upper mold and the lower mold may be split into a plurality of molds.

REFERENCE SIGNS LIST

100 RESIN SHAPING MOLD
101 UPPER MOLD
101a INCLINED SURFACE
102 LOWER MOLD
103 SLIDING MECHANISM
103a SURFACE
103b SURFACE
103c FITTING PORTION
103d INCLINED SURFACE
104 RUBBER MEMBER
104a FITTING PORTION
105 CAVITY SPACE
111 PLATE
112 PLATE
200 RESIN
1031 PEDESTAL
1032 PRESSING PORTION

The invention claimed is:

1. A resin shaping mold comprising:
a first mold;
a second mold arranged to be opposed to the first mold;
a sliding mechanism including a pedestal and a pressing portion on a top surface of the pedestal, a bottom surface of the pedestal configured to be slidable on a surface of the second mold and the pressing portion having a pressing surface including a surface directed in a different direction from a direction of pressing on a resin by the first mold and the second mold; and
a first rubber member formed to cover at least the pressing surface of the pressing portion, a gap along the top surface of the pedestal between the pressing surface and the second mold, and at least a portion of a top surface of the pressing portion that extends from the pressing surface.

2. The resin shaping mold according to claim 1, wherein a cavity space which defines a shape of the resin is surrounded by the first mold and the first rubber member.

3. The resin shaping mold according to claim 1, wherein a cavity space which defines a shape of the resin is surrounded by the first mold, the second mold, and the first rubber member.

4. The resin shaping mold according to claim 1, wherein
the first rubber member is formed to further cover a part of the surface of the second mold, and
a cavity space which defines a shape of the resin is surrounded by the first mold and the first rubber member.

5. The resin shaping mold according to claim 1, further comprising a second rubber member formed to cover a surface of the first mold,
wherein a cavity space which defines a shape of the resin is surrounded by the first rubber member and the second rubber member.

6. The resin shaping mold according to claim 1, wherein the sliding mechanism and the first rubber member have fitting shapes which are fitted to each other.

7. The resin shaping mold according to claim 1, wherein the first mold and the pedestal of the sliding mechanism respectively have inclined surfaces which have predetermined angles relative to the direction of pressing on the resin by the first mold and the second mold and are formed to slide on each other during a press of the resin.

8. The resin shaping mold according to claim 1, further comprising a motive power unit configured to slide the sliding mechanism.

9. The resin shaping mold according to claim 1, comprising a return mechanism configured to return the sliding mechanism to a position, at a time before a press, in removal of molds.

10. The resin shaping mold according to claim 1, wherein the second mold and the sliding mechanism have guide structures which define a sliding direction of the sliding mechanism.

11. The resin shaping mold according to claim 7, wherein the inclined surface of the pedestal is located on a side opposite to the pressing surface.

* * * * *